(12) United States Patent
Jung et al.

(10) Patent No.: US 12,113,191 B2
(45) Date of Patent: Oct. 8, 2024

(54) POUCH TYPE BATTERY CELL AND BATTERY PACK INCLUDING THE SAME

(71) Applicant: SK On Co., Ltd., Seoul (KR)

(72) Inventors: Jun Hee Jung, Daejeon (KR); Jae Il Hwang, Daejeon (KR); Bon Seok Ku, Daejeon (KR); Jeong Hwan Lee, Daejeon (KR); Sei Hoon Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 106 days.

(21) Appl. No.: 17/560,536

(22) Filed: Dec. 23, 2021

(65) Prior Publication Data

US 2022/0209325 A1 Jun. 30, 2022

(30) Foreign Application Priority Data

Dec. 24, 2020 (KR) ........................ 10-2020-0183206

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/647* (2015.04); *H01M 10/6553* (2015.04); *H01M 10/6556* (2015.04); *H01M 10/6568* (2015.04); *H01M 50/184* (2021.01); *H01M 50/211* (2021.01); *H01M 50/249* (2021.01); *H01M 50/264* (2021.01); *H01M 50/30* (2021.01); *H01M 50/35* (2021.01); *H01M 50/358* (2021.01); *H01M 50/367* (2021.01); *H01M 50/502* (2021.01); *H01M 50/505* (2021.01); *H01M 50/507* (2021.01);
(Continued)

(58) Field of Classification Search
None
See application file for complete search history.

(56) References Cited

U.S. PATENT DOCUMENTS 11,183,729 B2 11/2021 He et al.
2006/0145657 A1* 7/2006 Hashida .............. H01M 50/543
320/107
(Continued)

FOREIGN PATENT DOCUMENTS

CN 111430603 A 7/2020
KR 1020190122474 A 10/2019
(Continued)

*Primary Examiner* — Ula C Ruddock
*Assistant Examiner* — Mary Grace Byram
(74) *Attorney, Agent, or Firm* — The Webb Law Firm

(57) ABSTRACT

Provided is a pouch-type battery cell capable of being directly accommodated in a battery pack, and a battery pack including the same. In the battery pack, a heat exchange portion of a battery cell assembly formed by stacking a plurality of battery cells each including an electrode tab lead portion and a heat exchange portion is configured to be in contact with a heat conduction member disposed on a bottom portion of a housing without a sealed surface, and a corner portion formed to protrude from one end of the electrode tab lead portion is configured to be accommodated through a bus bar assembly, a cover plate, or a step portion of the bottom portion of the housing to be electrically insulated.

14 Claims, 7 Drawing Sheets

(51) Int. Cl.
*H01M 10/647* (2014.01)
*H01M 10/6553* (2014.01)
*H01M 10/6556* (2014.01)
*H01M 10/6568* (2014.01)
*H01M 50/184* (2021.01)
*H01M 50/211* (2021.01)
*H01M 50/249* (2021.01)
*H01M 50/264* (2021.01)
*H01M 50/30* (2021.01)
*H01M 50/35* (2021.01)
*H01M 50/358* (2021.01)
*H01M 50/367* (2021.01)
*H01M 50/502* (2021.01)
*H01M 50/505* (2021.01)
*H01M 50/507* (2021.01)
*H01M 50/533* (2021.01)
*H01M 50/553* (2021.01)

(52) U.S. Cl.
CPC ....... *H01M 50/533* (2021.01); *H01M 50/553* (2021.01)

(56) References Cited

U.S. PATENT DOCUMENTS

| | | | |
|---|---|---|---|
| 2012/0114993 A1* | 5/2012 | Park | H01M 50/271 429/88 |
| 2013/0216896 A1* | 8/2013 | Kim | H01M 50/129 429/163 |
| 2014/0311768 A1* | 10/2014 | Takishita | H01R 13/447 174/66 |
| 2016/0111694 A1* | 4/2016 | Doornekamp | H01M 50/224 429/159 |
| 2017/0110771 A1* | 4/2017 | Tajima | B60L 50/66 |
| 2017/0187080 A1* | 6/2017 | Choi | H01M 10/613 |
| 2018/0048039 A1* | 2/2018 | Newman | H01M 10/625 |
| 2018/0287127 A1* | 10/2018 | Onnerud | B60L 50/64 |
| 2019/0074557 A1* | 3/2019 | Shin | H01M 10/6553 |
| 2019/0237832 A1 | 8/2019 | Ju et al. | |
| 2020/0287182 A1* | 9/2020 | Kong | H01M 50/258 |
| 2021/0066689 A1 | 3/2021 | Lee et al. | |
| 2021/0119309 A1* | 4/2021 | Jeong | H01M 50/209 |
| 2021/0226295 A1 | 7/2021 | Kwon et al. | |
| 2022/0006142 A1 | 1/2022 | Lee | |
| 2022/0059901 A1* | 2/2022 | Ren | A62C 3/08 |
| 2022/0102787 A1 | 3/2022 | He et al. | |
| 2022/0158288 A1 | 5/2022 | Baek et al. | |
| 2022/0181733 A1* | 6/2022 | Choi | H01M 50/244 |
| 2022/0352591 A1* | 11/2022 | Chi | H01M 50/298 |

FOREIGN PATENT DOCUMENTS

| | | |
|---|---|---|
| KR | 102085339 B1 | 3/2020 |
| KR | 1020200069752 A | 6/2020 |
| WO | 2020143171 A1 | 7/2020 |
| WO | 2020230998 A1 | 11/2020 |
| WO | 2020251141 A1 | 12/2020 |

* cited by examiner

POUCH TYPE BATTERY CELL AND BATTERY PACK INCLUDING THE SAME

CROSS-REFERENCE TO RELATED APPLICATION

This application claims priority to Korean Patent Application No. 10-2020-0183206 filed Dec. 24, 2020, the disclosure of which is hereby incorporated by reference in its entirety.

BACKGROUND OF THE INVENTION

Field of the Invention

The following disclosure relates to a pouch-type battery cell and a battery pack including the same, and more particularly, to a technology of directly seating a pouch-type battery cell in a battery pack without using a module casing.

DESCRIPTION OF THE INVENTION

In general, a battery pack has been manufactured in a form in which a plurality of modules connected to each other in series or parallel are configured in the battery pack and each of the modules includes a plurality of battery cells connected to each other in series or parallel.

Each module has used a separate casing member to accommodate the plurality of battery cells. Therefore, there is a limitation in increasing a size of the battery cells accommodated in the battery pack, and resultantly, a capacity of the battery cells may not be further increased.

In addition, a lithium ion battery has a high voltage region, which causes heat generation, and an organic solvent such as ethylene carbonate, diethylene carbonate, methylene carbonate, or propylene carbonate used as an electrolyte in the lithium ion battery is vaporized during use, such that a problem such a swelling occurs. The heat and the gas generated as such may cause an explosion of a deteriorated battery cell, and may cause a so-called thermal propagation problem that the exploded battery cell has an influence on neighboring battery cells to successively cause explosions of the battery cells.

In addition, in the related art, a safety device, a cooling device, and various control devices for processing the heat and the gas generated inside the module have been installed. However, in such a manner, the various devices described above should be included in the module, and a space in which the battery cells may thus be accommodated within a limited module space becomes insufficient. As a result, a ratio of the battery cells to a total volume of the battery pack decreases, such that a battery capacity may decrease.

RELATED ART DOCUMENT

Patent Document (Patent Document 1) Korean Patent Laid-Open Publication No. 10-2020-0069752 (entitled "Pouch-type Battery Cell Having Venting Member and Battery Pack Comprising the Same" and published on Jun. 17, 2020)

SUMMARY OF THE INVENTION

An embodiment of the present invention is directed to providing a battery pack including pouch-type battery cells capable of increasing a battery capacity by making as few components as possible among existing components remaining and then directly stacking the pouch-type battery cells in the battery pack to maximally increase a ratio of the pouch-type battery cells to a total volume of the battery pack.

Another embodiment of the present invention is directed to providing a battery pack capable of safely discharging a gas or the like leaked at the time of occurrence of an event such as thermal propagation to the outside.

In one general aspect, a battery pack includes: a battery cell assembly formed by stacking a plurality of battery cells each including an electrode tab lead portion and a heat exchange portion; a housing in which a plurality of battery cell assemblies are seated and which includes a bottom portion and a sidewall portion; and a heat conduction member disposed between the heat exchange portion and the bottom portion, wherein the electrode tab lead portion includes a sealed surface formed by thermally compressing a pouch accommodating an electrode assembly, and the heat exchange portion is in contact with the heat conduction member without the sealed surface.

The electrode tab lead portion may further include a corner portion at one end thereof, and the corner portion may protrude more toward the bottom portion than the heat exchange portion.

The battery cell assembly may include a bus bar assembly including a metal bus bar coupled to the electrode tab lead portion and an insulator supporting the metal bus bar, and a lower portion of the insulator may extend between the corner portion and the bottom portion.

The battery cell assembly may include a bus bar assembly including a metal bus bar coupled to the electrode tab lead portion and an insulator supporting the metal bus bar and a cover plate for protecting the bus bar assembly, and an extension portion extending between the corner portion and the bottom portion may be formed at a lower portion of the cover plate.

The cover plate may be formed integrally with the sidewall portion of the housing.

The bottom portion of the housing may include a step portion for accommodating the corner portion formed to protrude more toward the bottom portion than the heat exchange portion.

The bottom portion may include at least two layers, a first layer may include a refrigerant channel, and a second layer may include a hole for forming the step portion.

The step portion may include an insulating layer for electrical insulation from the corner portion.

The sidewall portion of the housing may include a sidewall vent hole for discharging a gas.

A central portion of the housing may include a center beam formed of the sidewall portion of the housing, and the center beam may include a gas discharge hole for discharging the gas to the outside.

The bus bar assembly may include a bus bar vent hole for discharging a gas generated in the battery cell assembly.

The battery cell assembly may include a first side cover having a fastening portion having a first shape for fastening the battery cell assembly to a neighboring battery cell assembly and a second side cover having a fastening portion having a second shape for fastening the battery cell assembly to another neighboring battery cell assembly.

The fastening portion having the first shape may be an assembling pin, and the fastening portion having the second shape may be an assembling hole corresponding to the assembling pin.

A protruding assembling portion for coupling to the bottom portion of the housing may be formed on a lower end portion of the first side cover.

A bolting groove may be formed in an upper end portion of the first side cover so as not to interfere with the protruding assembling portion when the protruding assembling portion is coupled to the bottom portion of the housing.

When the first side cover is coupled to a second side cover of the neighboring battery cell assembly, a channel may be formed between the first side cover and the second side cover.

The battery cell may further include a folding portion positioned on a side opposite to the heat exchange portion and formed by folding the sealed surface, the electrode tab lead portion may be led in both directions so that a center of the electrode tab lead is closer to the heat exchange portion than the folding portion, and a pre-folding line may be formed in the folding portion so that the sealed surface is easily bent.

DETAILED DESCRIPTION OF MAIN ELEMENTS

| | |
|---|---|
| 1000: battery pack | |
| 100: battery cell | |
| 110: electrode tab lead portion | |
| 111: sealed surface | 112: corner portion |
| 120: heat exchange portion | |
| 130: folding portion | 131: pre-folding line |
| 200: battery pack housing | |
| 210: bottom portion | |
| 211: step portion | 212: refrigerant channel |
| 213: insulating layer | 214: cover assembling portion |
| 220: sidewall portion | 221: sidewall vent hole |
| 230: center beam | 231: gas discharge hole |
| 240: heat conduction member | |
| 300: bus bar assembly | |
| 310: metal bus bar | 320: insulator |
| 330: bus bar vent hole | |
| 400: cover plate | 410: extension portion |
| 500: battery cell assembly | |
| 510: front cover plate | |
| 512: connection member | 520: rear cover plate |
| 521: clip assembling portion | |
| 530: first side cover | |
| 531: bolting groove | 532: assembling pin |
| 534: protruding assembling portion | |

-continued

| | |
|---|---|
| 535: side hole | |
| 540: second side cover | |
| 541: assembling hole | |

DESCRIPTION OF THE INVENTION

Hereinafter, the technical spirit of the present invention will be described in more detail with reference to the accompanying drawings. Terms and words used in the present specification and the claims are not to be restrictively construed as general or dictionary meanings, but are to be construed as meanings and concepts consistent with the technical spirit of the present invention based on a principle that the present inventors may appropriately define the concepts of terms in order to describe their inventions in the best mode.

Accordingly, configurations described in embodiments and drawings of the present invention are merely most preferable embodiments, and do not represent all of the technical spirits of the present invention. Therefore, it should be understood that there may be various modifications capable of substituting for these embodiments at a point in time when the present application is filed.

Meanwhile, terms indicating directions such as forward, backward, upward, downward, and the like, are used in the present specification, but it is obvious to those skilled in the art to which the present invention pertains that are only for convenience of description, and may be expressed differently depending on an observing position of an observer, positions of targets, or the like.

Figure 1:
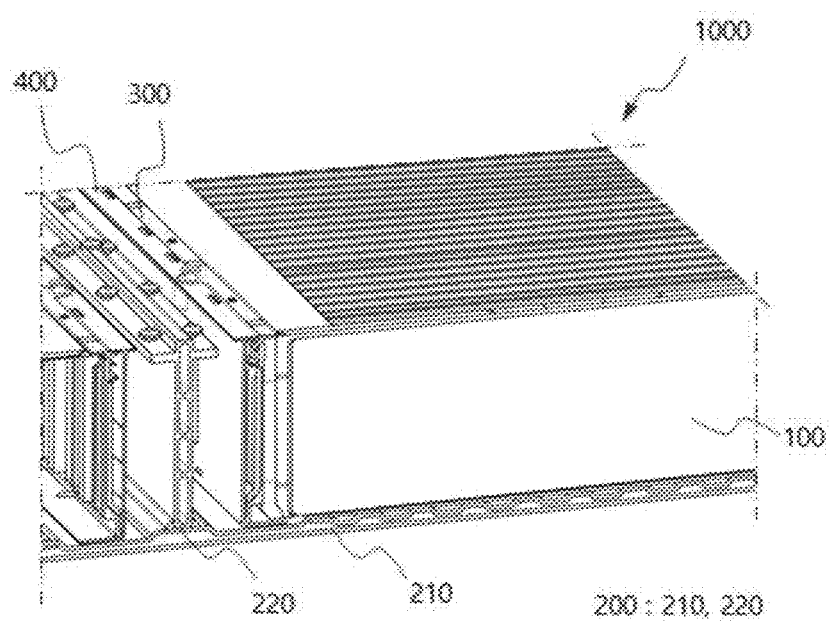
FIG. 1 is a cut-away perspective view of a battery pack according to the present invention.

FIG. 1 is a cut-away perspective view of a battery pack 1000 according to the present invention. Referring to FIG. 1, the battery pack 1000 according to the present invention may include a battery cell assembly in which battery cells 100 are stacked in one direction, a bus bar assembly 300 coupled to one end of the battery cell assembly, a cover plate 400 coupled to one end of the bus bar assembly 300, and a battery pack housing 200 accommodating the battery cell assembly, the bus bar assembly 300, and the cover plate 400 and including a bottom portion 210 and a sidewall portion 220 illustrated in FIG. 7. In this case, a center beam 230 may be formed inside the battery pack housing 200, and a detailed configuration and operation of the center beam 230 will be described later.

The battery cell assembly has a structure in which a plurality of pouch-type battery cells 100 to be described later are stacked, and the bus bar assembly 300 for electrically connecting electrode tabs led to at least one side of the battery cells 100 to each other may be configured on at least one side of the battery cell assembly so as to correspond to the electrode tabs.

In addition, a separate cover plate 400 may be configured on at least one side of the bus bar assembly 300 in a way that the cover plate 400 corresponds to the bus bar assembly 300 from the outside, but a capacity of the battery cells may be further increased by omitting the separate cover plate 400 and seating only the battery cell assembly and the bus bar assembly 300 in the battery pack housing 200.

The bottom portion 210 of the battery pack housing 200 according to the present invention has the battery cell assembly seated thereon, and may include a refrigerant channel 212 for cooling heat generated from the battery cell assembly. In addition, the sidewall portion of the battery pack housing 200, which is a structure formed in a direction perpendicular to the bottom portion 210, may form a space for accommodating the battery cell assembly together with the bottom portion 210, and may serve to reinforce rigidity of the battery pack housing 200. Such a sidewall portion may include the sidewall portion 220 surrounding an outer side of the battery pack housing 200, the center beam 230 formed across a housing space, and a cover assembling portion 214 or side covers 530 and 540 formed in a direction perpendicular to the center beam and partitioning a space in which the battery cell assembly is seated or coupled to the battery cell assembly.

Figure 2:
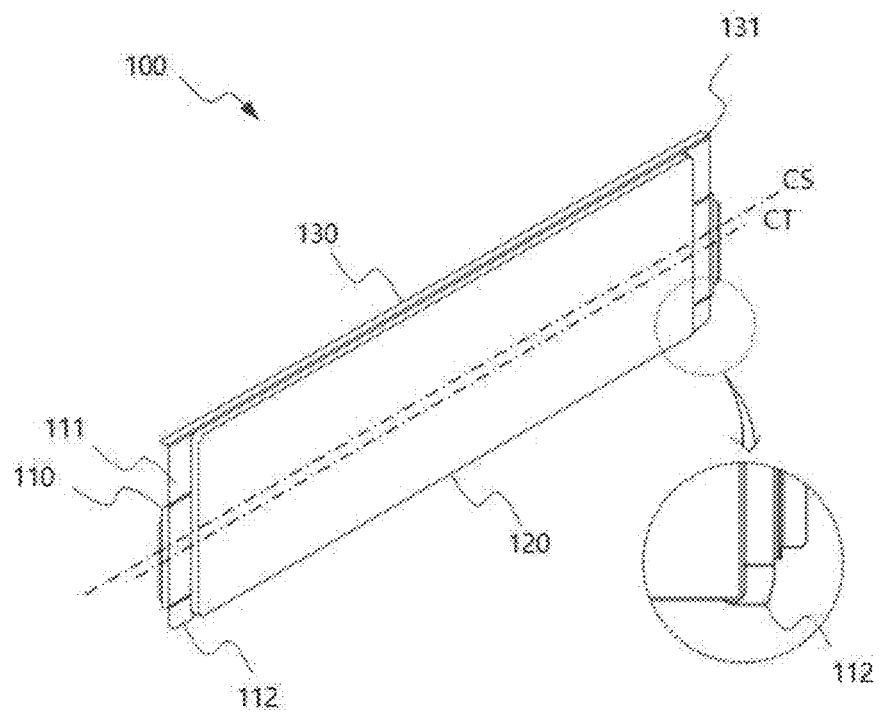
FIG. 2 is a perspective view and a partially enlarged view of a battery cell according to the present invention.

FIG. 2 is a perspective view and a front view of the battery cell 100 according to the present invention. The battery cell 100 according to the present invention will be described in more detail with reference to FIG. 2. The battery cell 100 according to the present invention includes an electrode tab lead portion 110 formed at one end or both ends thereof and a heat exchange portion 120 dissipating heat to the bottom portion of the battery pack housing 200, wherein the electrode tab lead portion 110 includes a sealed surface 111 formed by thermally compressing a pouch accommodating an electrode assembly, while the heat exchange portion 120 is formed without a sealed surface 111 in order to conduct heat well to the bottom portion. In a case where the sealed surface does not exist, a contact area with the bottom portion may be increased, through which thermal conductivity may be improved, and the battery cells 100 may be stacked in the battery pack housing 200 without using a separate support structure between the battery cells in a case where the battery cells 100 are stacked.

In this case, the electrode tab lead portion 110 further includes a corner portion 112 at one end thereof, and the corner portion 112 is formed to extend and protrude more toward the bottom portion than a lower surface of the heat exchange portion 120. The corner portion 112, which is formed when the sealed surface 111 of the electrode tab lead portion 110 is formed by thermally compressing the pouch, is a portion protruding more to a lower surface than the heat exchange portion 120 of the battery cell 100 to require a special countermeasure in terms of heat transfer or insulation.

Meanwhile, the battery cell 100 according to the present invention further includes a folding portion 130 positioned on an upper side opposite to the heat exchange portion 120 and formed by folding the sealed surface. In this case, it is preferable that the electrode tab lead portion 110 is led so that the center CT of the electrode tab lead portion 110 is closer to the heat exchange portion 120 than the center CS of the battery cell 100 is, through which an upper space of the bus bar assembly 300 electrically connected to the electrode tab may be more sufficiently secured and a circuit component for sensing a voltage of the battery cell 100 may be disposed.

In addition, it is preferable that a pre-folding line is formed in the folding portion 130 so that an upper sealed surface is easily bent. Usually, in a case where the sealed surface is bent, the sealed surface tends to be restored to its original state over time, and in a case where the sealed surface is bent along a length direction, there is a problem that the sealed surface is bent in a meandering shape rather than a straight line shape. However, if a folding line is first formed at a predetermined temperature and pressure before the upper sealed surface is bent, the folding portion 130 may be smoothly formed without the problem as described above.

Figure 3:
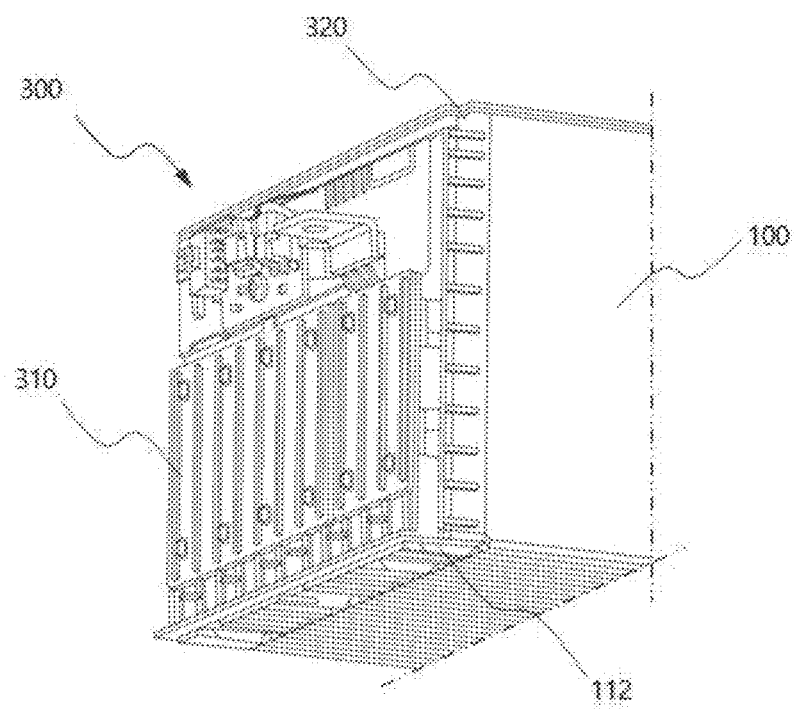
FIG. 3 is a view illustrating coupling between a battery cell assembly and a bus bar assembly according to the present invention.

FIG. 3 is a view illustrating coupling between the battery cell assembly and the bus bar assembly 300. Referring to FIG. 3, the bus bar assembly 300 according to the present invention includes a metal bus bar 310 coupled to the electrode tab lead portion 110 and an insulator 320 supporting the metal bus bar 310, and various circuit components may be disposed in the upper space of the bus bar assembly 300 by leading the electrode tab lead portion so that the center CT of the electrode tab lead portion is close to the bottom portion, as described above. In this case, a lower portion of the insulator 320 may be formed to extend between the corner portion 112 of the battery cell 100 and the bottom portion 210 of the battery pack housing 200, which will be described in more detail with reference to FIG. 5.

Figure 4:
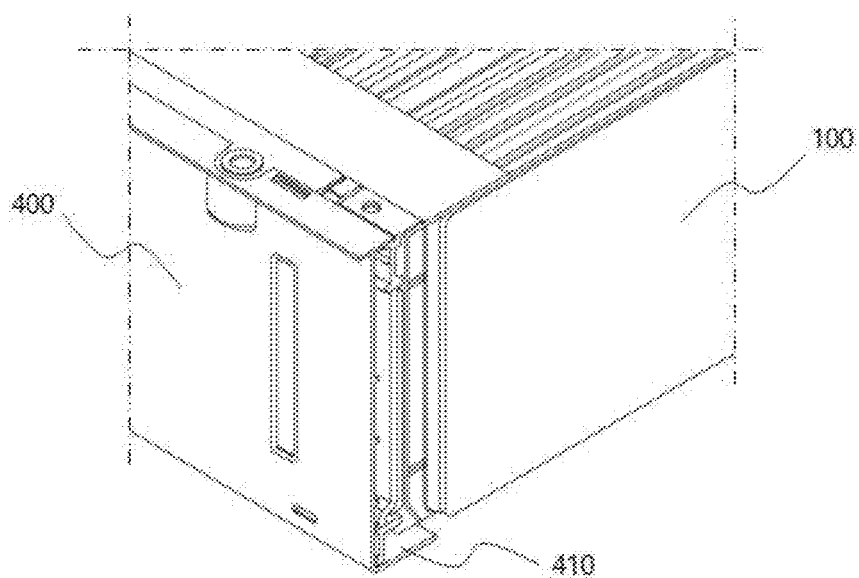
FIG. 4 is a view illustrating coupling between the battery cell assembly and a cover plate according to the present invention.

FIG. 4 is a view illustrating coupling between the battery cell assembly and the cover plate 400. Referring to FIG. 4, the cover plate 400 according to the present invention is coupled to one side of the bus bar assembly 300 to protect the bus bar assembly 300. In this case, an extension portion 410 extending between the corner portion 112 of the battery cell 100 and the bottom portion 210 of the battery pack housing 200 may be formed at a lower portion of the cover plate 400 to prevent the corner portion 112 of the battery cell 100 from coming into contact with the bottom portion of the battery pack housing 200.

Figure 5:
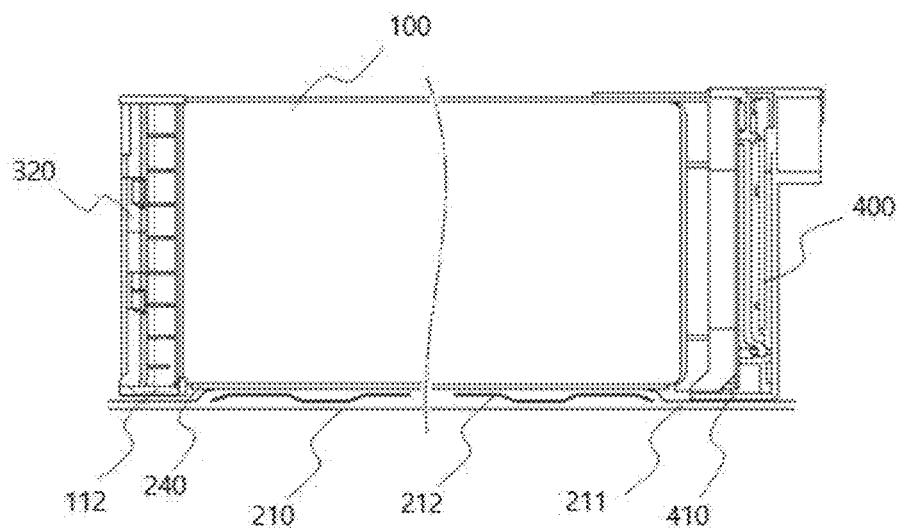
FIG. 5 is a view for describing a coupling relationship between the battery cell, the bus bar assembly, the cover plate, and a bottom portion of a battery pack housing according to the present invention.

FIG. 5 is a view for describing a coupling relationship between the battery cell 100, the insulator 320 of the bus bar assembly 300, the cover plate 400, and the bottom portion 210 of the battery pack housing 200 according to the present invention. Referring to a left side of FIG. 5 illustrating a coupling relationship between the battery cell 100 and the insulator 320 of the bus bar assembly 300, the lower portion of the insulator 320 of the bus bar assembly 300 may be formed to extend between the corner portion 112 of the battery cell 100 and the bottom portion 210 of the battery pack housing 200 to prevent the corner portion 112 of the battery cell 100 from coming into direct contact with the bottom portion of the battery pack housing 200. Referring to a right side of FIG. 5 illustrating a coupling relationship between the battery cell 100 and the cover plate 400, the extension portion 410 extending between the corner portion 112 of the battery cell 100 and the bottom portion 210 of the battery pack housing 200 may be formed at the lower portion of the cover plate 400 to prevent the corner portion 112 of the battery cell 100 from coming into direct contact with the bottom portion of the battery pack housing 200. It has been illustrated in an embodiment of the drawings that the cover plate 400 is illustrated as a component separate from the battery pack housing 200, but the cover plate 400 may be formed integrally with the sidewall portion 220 of the battery pack housing 200, through which the number of components and the number of coupling processes may be decreased and space efficiency may be improved.

Referring to FIG. 5, a heat conduction member 240 may be disposed between the heat exchange portion 120 of the battery cell 100 and the bottom portion 210 of the battery pack housing 200 to be in thermally close contact with the heat exchange portion 120 of the battery cell 100 and improve heat conduction. In addition, a step portion 211 may be formed in the bottom portion 210 of the battery pack housing 200 corresponding to the corner portion 112 of the battery cell so as to accommodate the corner portion 112 of the electrode tab lead portion 110 formed to protrude more toward the bottom portion than the heat exchange portion 120. In addition, the bottom portion 210 may include at least two layers, and a first layer of an upper portion of the two layers is a layer in which a hole for forming the step portion 211 is formed and a second layer of a lower portion of the two layers is a layer in which a refrigerant channel 212 through which a refrigerant may flow is formed. Meanwhile, an insulating layer 213 for electrical insulation from the corner portion 112 may be formed in the step portion 211 to more completely implement electrical insulation between the battery cell 100 and the battery pack housing 200.

Figure 6:
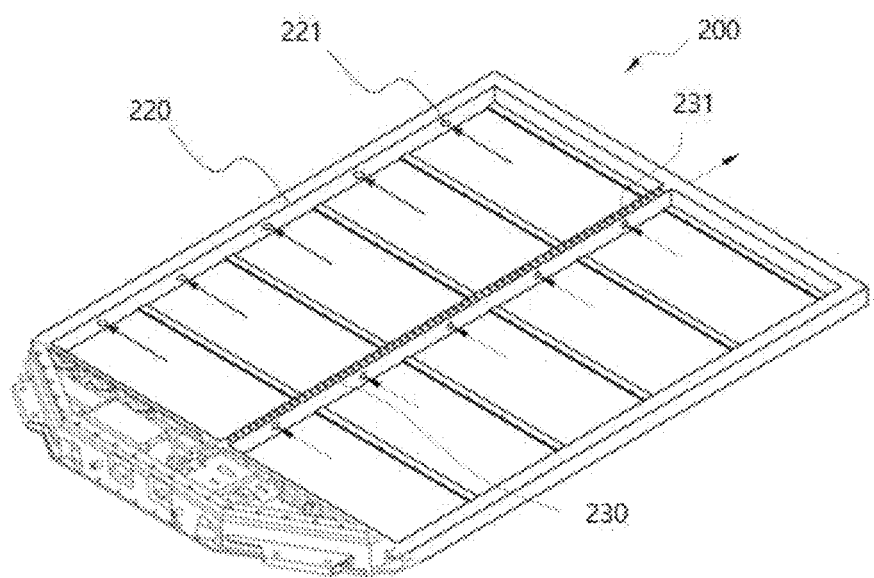
FIGS. 6 to 8 are views for describing gas discharge from the battery pack housing according to the present invention.
Figure 7:
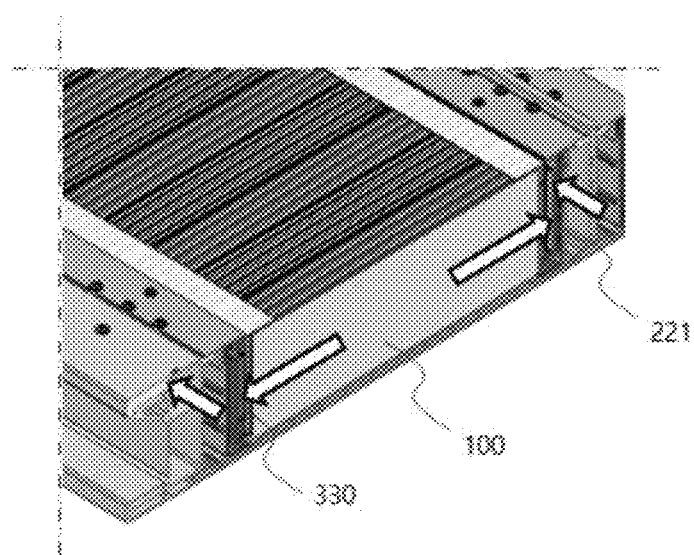
Figure 8:
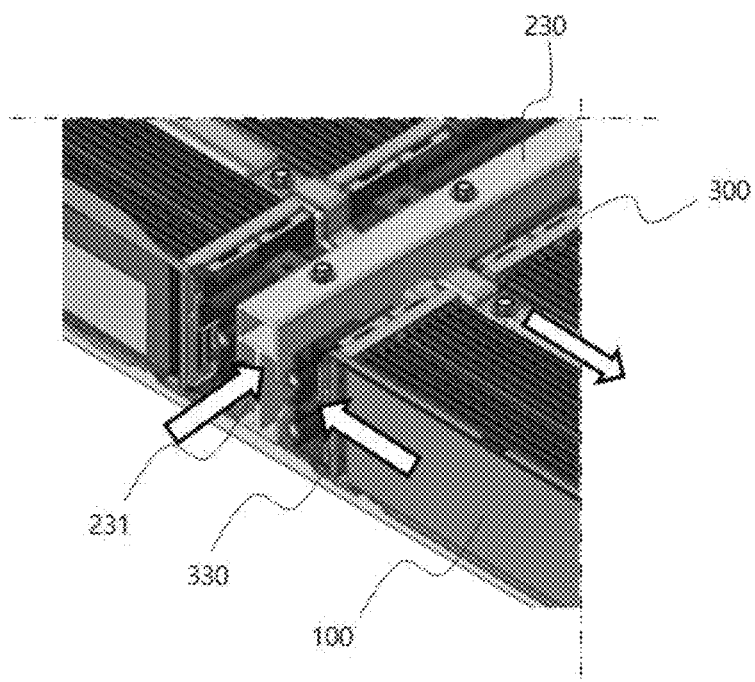

FIGS. 6 to 8 are views for describing gas discharge from the battery pack housing 200 according to the present invention. Referring to FIG. 6, sidewall vent holes 221 may be formed in the sidewall portion 220 of the battery pack housing 200 to discharge the gas generated in the battery cell assembly to the outside. In addition, referring to FIG. 6, the center beam 230 constituting the sidewall portion 220 of the battery pack housing 200 is formed at a central portion of the battery pack housing 200, and gas discharge holes 231 for discharging the gas generated in the battery cell assembly to the outside are also formed in the center beam 230. A gas discharge flow of the present invention will be described in more detail with reference to FIGS. 7 and 8. The gas generated in the battery cell assembly passes through bus bar vent holes 330 formed in the bus bar assembly 300, and is then discharged to the outside through the sidewall vent holes 221 as illustrated in FIG. 7 or discharged to the outside through the gas discharge holes 231 of the center beam 230 as illustrated in FIG. 8. In this case, in order to smoothly discharge the gas generated inside the battery cell 100, it is preferable to install the battery cell assembly in a gas discharge direction.

For example, referring to FIG. 6, the battery cell assembly in FIG. 7 may have a stacked structure so that a lead direction of the electrode tabs is parallel to the center beam 230, and thus, the gas generated in the battery cell assembly at the time of thermal propagation may be discharged to the outside through vent holes formed in the cover assembling portion 214 or the side covers 530 and 540. As another embodiment, as illustrated in FIG. 8, in a case where the battery cells are stacked so that the lead direction of the electrode tabs of the battery cell is directed toward the center beam 230, the gas generated in the battery cell assembly may be discharged to the outside through the gas discharge holes 231 of the center beam 230. In addition, in a case of an embodiment of FIGS. 7 and 8, the bus bar vent holes 330 may be additionally formed in the bus bar assembly 300 coupled to the electrode tab lead portion 110 so that the gas generated in the battery cell assembly may be discharged well to the outside through the corresponding sidewall portion.

Figure 9:
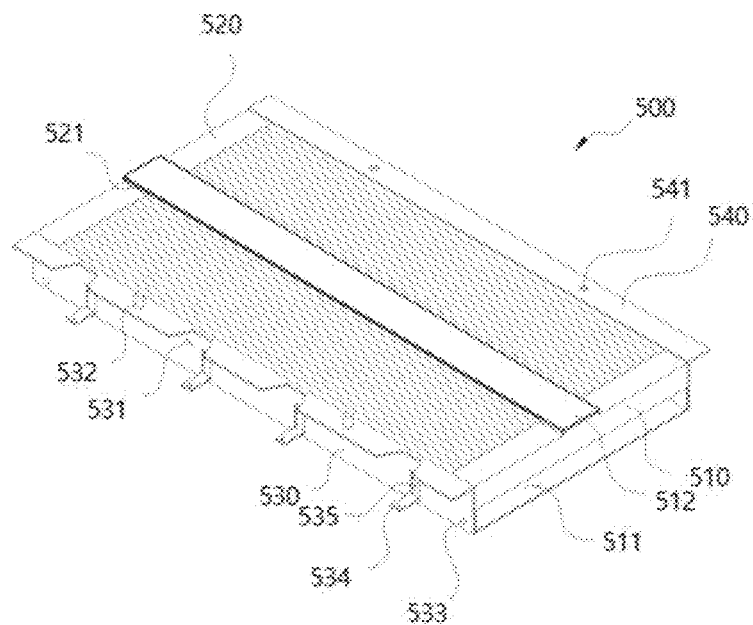
FIGS. 9 to 12 are views for describing an assembly with a neighboring battery cell assembly and an assembly with a battery pack housing according to the present invention.
Figure 10:
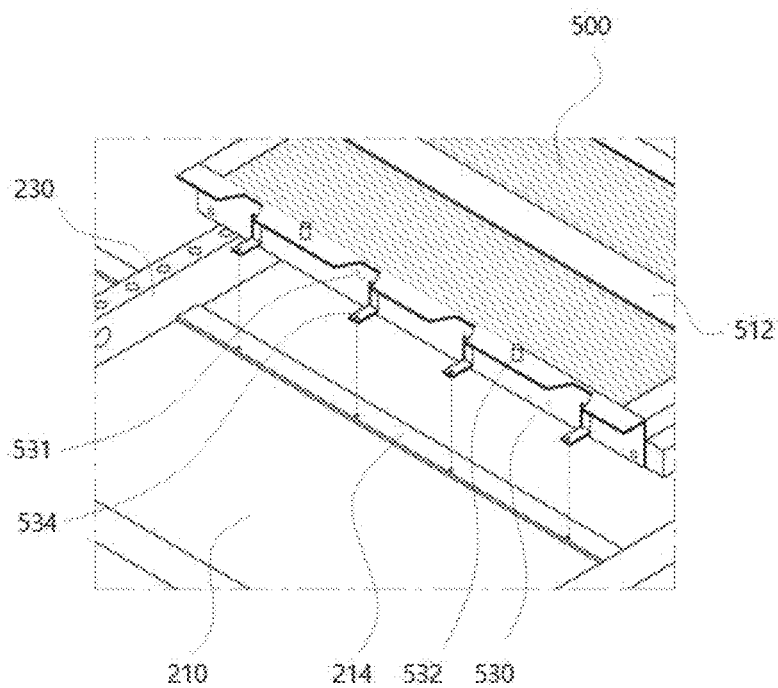

FIG. 9 is a view illustrating a battery cell assembly 500 according to another embodiment of the present invention, and FIG. 10 is a view for describing coupling between the battery cell assembly 500 according to another embodiment of the present invention and the battery pack housing 200. In more detail, the battery cell assembly 500 may further include side covers 530 and 540 in addition to the structure of the battery cell assembly described above, and the side cover may be provided with protruding assembling portions 534 so as to be capable of being assembled to the battery pack housing 200. The protruding assembling portions 534 formed on the side cover may be directly fastened to and fixed to the bottom portion 210 of the battery pack housing 200, but may also be fastened to the cover assembling portion 214 provided in order to reinforce a mechanical strength of the battery pack housing 200. In this case, bolting grooves 531 may be further provided on the side cover in order to smoothly assemble the battery cell assembly 500 to the battery pack housing 200 using the protruding assembling portions 534. The bolting grooves 531 are formed in an upper end portion of the first side cover so as not to interfere with the protruding assembling portion 534 when the protruding assembling portion 534 is coupled to the bottom portion of the battery pack housing 200. In addition, the cover assembling portion 214 formed on the bottom portion 210 of the battery pack housing 200 may be formed to have a width corresponding to that of the protruding assembling portion 534 formed on the side cover.

In addition, the battery cell assembly 500 may include a connection member 512 that connects a front cover plate 510 and a rear cover plate 520 to each other and may strengthen a fastening strength, and the front cover plate 510 and the rear cover plate 520 may be fastened to each other through a clip assembling portion 521.

Figure 11:
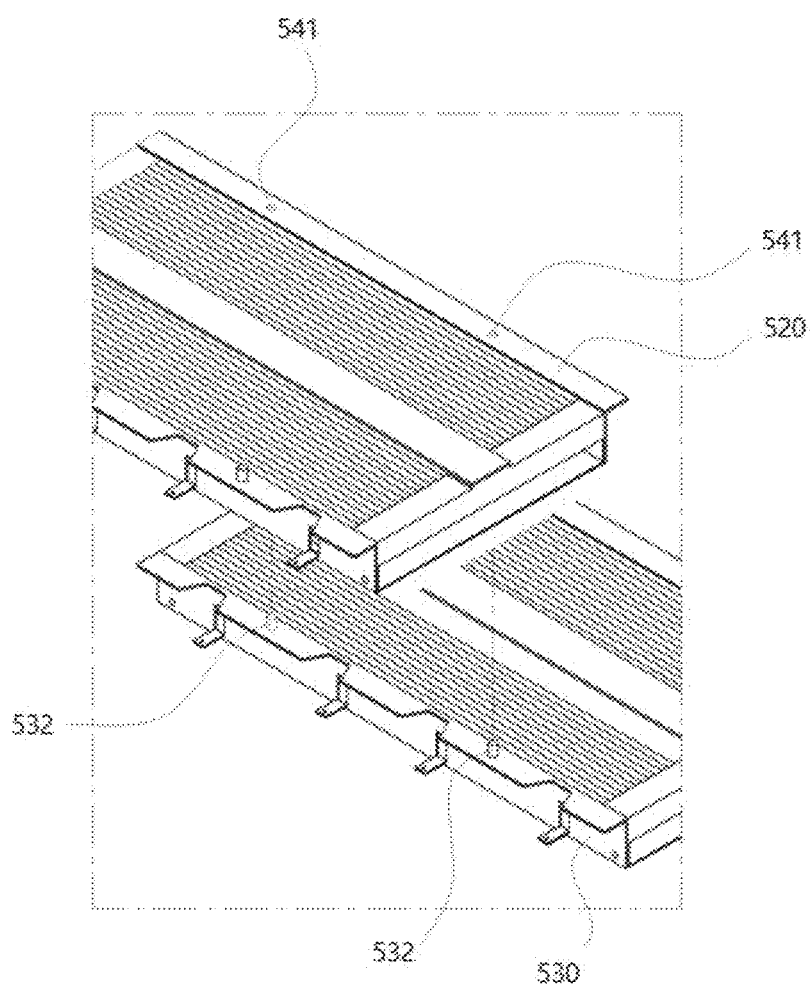
Figure 12:
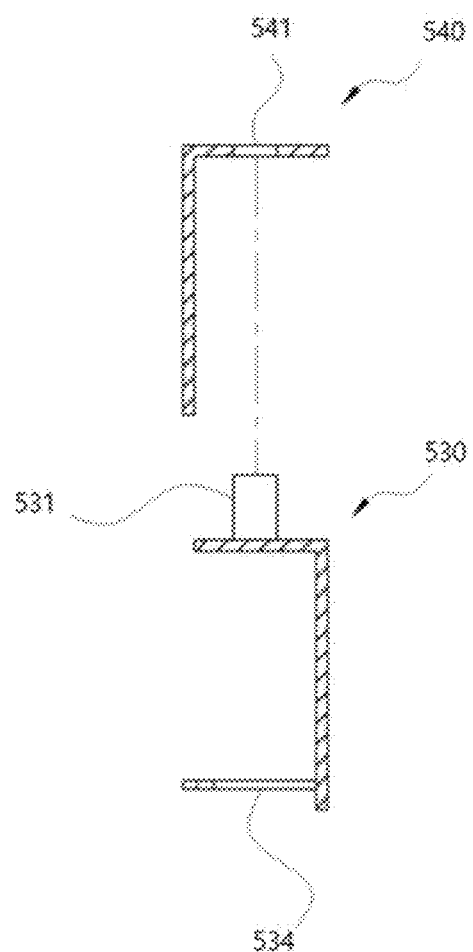

FIGS. 11 and 12 are views for describing coupling between battery cell assemblies 500 neighboring to each other. Referring to FIGS. 11 and 12, the battery cell assembly 500 may include a first side cover 530 formed at one side thereof and having a fastening portion having a first shape and a second side cover 540 formed at the other side thereof and having a fastening portion having a second shape.

The fastening portion having the first shape, formed in the first side cover 530 may be one or more assembling pins 532. In addition, the fastening portion having the second shape, formed in the second side cover 540 may be assembling holes 541 that may be fastened to correspond to one or more assembling pins 532.

The assembling pins 532 formed on one side of the battery cell assembly 500 may be fastened to assembling holes 541 formed on the other side of a battery cell assembly 500 disposed to neighbor to the battery cell assembly 500. In more detail, assembling holes 541 of a second side cover 540 coupled to the other side of another battery cell assembly 500 neighboring to the battery cell assembly 500 are coupled to the assembling pins 532 provided at an upper end of the first side cover 530 coupled to one side of the battery cell assembly 500, in a direction from the top toward the bottom.

The second side cover 540 coupled to the other side of another battery cell assembly 500 neighboring to the battery cell assembly 500 is coupled to the first side cover 530 coupled to one side of the battery cell assembly 500, in the direction from the top toward the bottom. In this case, a channel may be formed in a space spaced by protruding upper ends of the first side cover 530 and the second side cover 540. The channel may be utilized as a passage for discharging the gas generated at the time of thermal propagation. In addition, the first side cover 530 and the second side cover 540 may be formed of a steel material to reinforce mechanical rigidity of the battery pack at the time of fastening the battery cell assembly to the battery pack housing. In addition, the side cover may further include a plurality of side holes 535 for gas discharge or heat exchange.

In the battery pack according to the present invention, it is possible to increase a capacity of the battery pack by removing unnecessary module components to increase volume efficiency of the battery pack.

In addition, insulation performance may be improved by preventing the protruding corner portion of the battery cell from coming into direct contact with the bottom portion, and heat dissipation performance may be improved by bringing the heat exchange portion of the battery cell into close contact with the bottom portion through the heat conducting member.

Further, durability decreased due to removal of a module casing may be reinforced with the side cover.

Further, it is possible to prevent a fire by blocking heat propagation caused by a thermal propagation phenomenon of the battery cells through the side covers.

Further, the center beam may also discharge the gas discharged in the battery cell at the time of thermal propagation to the outside through the hole formed in the side cover.

Although exemplary embodiments of the present invention have been illustrated and described hereinabove, the present invention is not limited thereto, but may be variously modified and altered by those skilled in the art to which the present invention pertains without departing from the spirit and scope of the present invention claimed in the claims. These modifications and alterations are to fall within the scope of the present invention.

What is claimed is:

1. A battery pack comprising:
   a battery cell assembly formed by stacking a plurality of battery cells each comprising an electrode tab lead portion and a heat exchange portion;
   a battery pack housing in which a plurality of battery cell assemblies are seated and which comprises a bottom portion and a sidewall portion; and
   a heat conduction member disposed on above the bottom portion of the battery pack housing,
   wherein at least one center beam formed across a housing space is formed inside the battery pack housing,
   wherein the electrode tab lead portion further includes a corner portion at one end thereof, and the corner portion protrudes more toward the bottom portion than the heat exchange portion,
   wherein the battery cell assembly includes a bus bar assembly including a metal bus bar coupled to the electrode tab lead portion and an insulator supporting the metal bus bar, and a lower portion of the insulator extends between the corner portion and the bottom portion,
   wherein the electrode tab lead portion comprises a sealed surface formed by thermally compressing a pouch accommodating an electrode assembly, and
   the heat exchange portion is in contact with the heat conduction member without the sealed surface,
   wherein the corner portion of each of the plurality of battery cells of the battery cell assembly is prevented from directly contacting the bottom portion of the battery pack housing by the lower portion of the insulator extending between the corner portion of each battery cell and the bottom portion of the battery pack housing, and
   wherein the bottom portion of the battery pack housing comprises a step portion for accommodating the corner portion formed to protrude more toward the bottom portion than the heat exchange portion, and
   wherein the heat exchange portion of each of the plurality of battery cells of the battery cell assembly is configured to be exposed downwardly, and is configured to be in direct contact with the heat conduction member disposed on the bottom portion of the battery pack housing so as to be in close contact with each other.

2. The battery pack of claim 1, wherein the battery cell assembly comprises a cover plate for protecting the bus bar assembly, and an extension portion extending between the corner portion and the bottom portion is formed at a lower portion of the cover plate.

3. The battery pack of claim 2, wherein the cover plate is formed integrally with the sidewall portion of the battery pack housing.

4. The battery pack of claim 1, wherein the bottom portion comprises at least two layers, a first layer of the at least two layers comprises a refrigerant channel, and a second layer of the at least two layers comprises a hole for forming the step portion.

5. The battery pack of claim 1, wherein the step portion comprises an insulating layer for electrical insulation from the corner portion.

6. The battery pack of claim 1, wherein the sidewall portion of the battery pack housing comprises a sidewall vent hole for discharging a gas.

7. The battery pack of claim 6, wherein a central portion of the battery pack housing includes the center beam formed of the sidewall portion of the battery pack housing, and the center beam comprises a gas discharge hole for discharging the gas to the outside.

8. The battery pack of claim 7, wherein the bus bar assembly comprises a bus bar vent hole for discharging a gas generated in the battery cell assembly.

9. The battery pack of claim 1, wherein the battery cell assembly comprises a first side cover having a fastening portion having a first shape for fastening the battery cell assembly to a neighboring battery cell assembly and a second side cover having a fastening portion having a second shape for fastening the battery cell assembly to another neighboring battery cell assembly.

10. The battery pack of claim 9, wherein the fastening portion having the first shape is an assembling pin, and the fastening portion having the second shape is an assembling hole corresponding to the assembling pin.

11. The battery pack of claim 10, wherein a protruding assembling portion for coupling to the bottom portion of the battery pack housing is formed on a lower end portion of the first side cover.

12. The battery pack of claim 11, wherein a bolting groove is formed in an upper end portion of the first side cover so as not to interfere with the protruding assembling portion when the protruding assembling portion is coupled to the bottom portion of the battery pack housing.

13. The battery pack of claim 9, wherein when the first side cover is coupled to a second side cover of the neighboring battery cell assembly, a channel is formed between the first side cover and the second side cover.

14. The battery pack of claim 1, wherein the battery cell further comprises a folding portion positioned on a side opposite to the heat exchange portion and formed by folding the sealed surface, the electrode tab lead portion is led in both directions so that a center of the electrode tab lead portion is closer to the heat exchange portion than a center of the battery cell, and a pre-folding line is formed in the folding portion so that the sealed surface is able to be bent therealong.

* * * * *